US012187150B2

(12) United States Patent
Yeda et al.

(10) Patent No.: US 12,187,150 B2
(45) Date of Patent: *Jan. 7, 2025

(54) SYSTEM AND METHOD OF INTELLIGENTLY ALLOCATING POWER

(71) Applicant: Aptiv Technologies AG, Schaffhausen (CH)

(72) Inventors: Shyambabu Yeda, Rochester Hills, MI (US); Mohamad Elghrawi, Dearborn, MI (US); Luke Berry, Holly, MI (US); Andrew Burchett, Kimball, MI (US); Chris Cooke, Auburn Hills, MI (US)

(73) Assignee: Aptiv Technologies AG, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,683

(22) Filed: Jan. 12, 2024

(65) Prior Publication Data
US 2024/0149735 A1 May 9, 2024

Related U.S. Application Data

(63) Continuation of application No. 17/146,978, filed on Jan. 12, 2021, now Pat. No. 11,904,718.
(Continued)

(51) Int. Cl.
*B60L 53/63* (2019.01)
*B60L 53/62* (2019.01)
*B60L 53/65* (2019.01)

(52) U.S. Cl.
CPC ............... *B60L 53/63* (2019.02); *B60L 53/62* (2019.02); *B60L 53/65* (2019.02)

(58) Field of Classification Search
CPC .......... H02J 7/342; B60L 53/62; B60L 53/63; B60L 53/65
See application file for complete search history.

(56) References Cited

U.S. PATENT DOCUMENTS

2016/0378154 A1 12/2016 Srivastava
2017/0005494 A1 1/2017 Li et al.
(Continued)

FOREIGN PATENT DOCUMENTS

CN 107636634 A * 1/2018 ............. G06F 1/266
CN 107706972 A 2/2018
(Continued)

OTHER PUBLICATIONS

"Office Action Mailed on Feb. 29, 2024" for Chinese Application No. 202111022935.6, 15 Pages.
(Continued)

*Primary Examiner* — David V Henze-Gongola
(74) *Attorney, Agent, or Firm* — Billion & Armitage

(57) ABSTRACT

A method of intelligently allocating power to one or more devices connected to a power delivery system includes detecting an event related to an allocation of power between the one or more connected devices. The method further includes maximizing an initial non-power delivery (non-PD) power provided to at least one of the connected devices based on an available shared capacity (ASC) associated with at least one connected device and also includes allocating power to the at least one connected device using PD protocols.

20 Claims, 8 Drawing Sheets

Related U.S. Application Data

(60) Provisional application No. 63/072,999, filed on Sep. 1, 2020.

(56) References Cited

U.S. PATENT DOCUMENTS

| | | | |
|---|---|---|---|
| 2017/0279270 A1 | 9/2017 | Motoki | |
| 2018/0356873 A1* | 12/2018 | Regupathy | G06F 1/3253 |
| 2019/0250689 A1* | 8/2019 | Ivanov | G06F 1/3203 |

FOREIGN PATENT DOCUMENTS

| | | |
|---|---|---|
| CN | 108664113 A | 10/2018 |
| TW | 201630305 A | 8/2016 |
| TW | 201703392 A | 1/2017 |
| WO | 2020141511 A1 | 7/2020 |

OTHER PUBLICATIONS

"Extended European Search Report Received mailed Jan. 20, 2022", 7 pages.

\* cited by examiner

SYSTEM AND METHOD OF INTELLIGENTLY ALLOCATING POWER

CROSS-REFERENCE TO RELATED APPLICATION(S)

This application is a continuation of U.S. application Ser. No. 17/146,978, filed Jan. 12, 2021, which claims the benefit of U.S. Provisional Patent Application No. 63/072,999, filed Sep. 1, 2020, titled "AUTOMOTIVE POWER SHARING ALGORITHM FOR USB TYPE-C POWER DELIVERY PORTS", which is incorporated by reference herein in its entirety.

BACKGROUND

Power delivery systems capable of providing charging power to electrical devices are ubiquitous in all physical spaces occupied by people, including automobiles. A power delivery system receives input power from a source and acts to distribute the received power to one or more ports (e.g., USB-type ports). In a typical environment, the power delivery system is connected to the power grid, which is capable of providing a stable supply of power. The power delivery system operates to share the power provided at the input to a plurality of connected loads. For example, the USB-IF provides a framework of general power sharing requirements, but these requirements fail to address some of the challenges presented in, for example, automotive applications that must content with variations of input voltages and temperatures, input power restrictions, and various fault conditions. Additionally, the USB-IF standards do not specify a method for two devices to share power in such a way that optimizes charging for each device. It would therefore be beneficial to develop a framework for handling power delivery/management in an automotive environment.

SUMMARY

According to one aspect, a method of intelligently allocating power to one or more devices connected to a power delivery system includes detecting an event related to an allocation of power between the one or more connected devices. The method further includes maximizing an initial non-power delivery (non-PD) power provided to at least one of the connected devices based on an available shared capacity (ASC) associated with at least one connected device and also includes allocating power to the at least one connected device using PD protocols.

According to another aspect, a power delivery system includes an input port configured to receive power from a power supply and at least a first output port, wherein the first output port is configured to supply power to a connected device. The power delivery system further includes a power delivery controller, wherein the power delivery controller maximizes an initial non-power delivery (non-PD) power provided to a device connected to the first output port during a first stage and utilizes power delivery (PD) protocols to increase power provided to the device connected to the first output port during the second stage.

DETAILED DESCRIPTION

Figure 1:
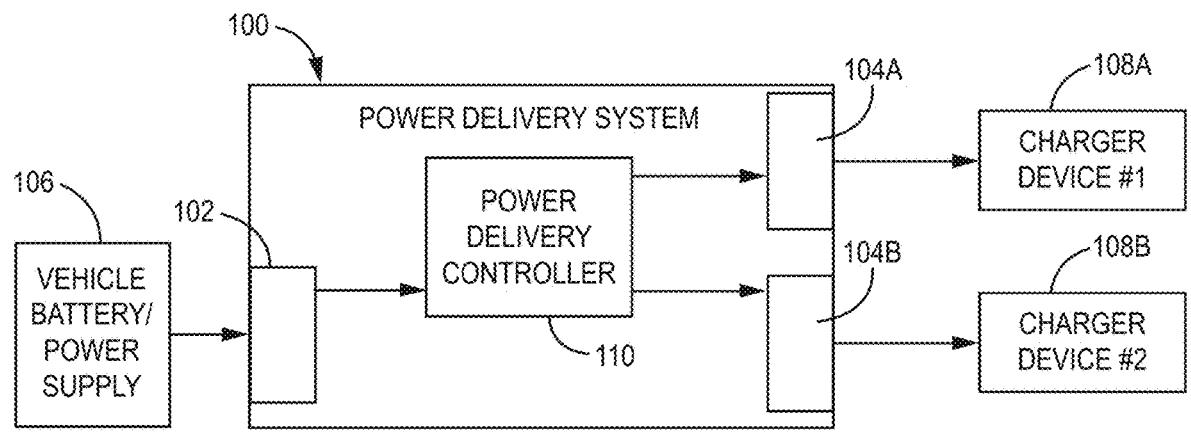
FIG. 1 is a block diagram of a vehicular charging system according to some embodiments.

According to some aspects, an intelligent power delivery system is utilized to intelligently manage power distributed to one or more loads. The power delivery system receives input from a source (e.g., car battery) and acts to intelligently distribute power to one or more output ports. For the purposes of this description, the following terms are utilized to describe the operation of the power delivery system.

Total Shared Capacity (TSC)—total power available to be distributed by the power delivery system. As described in more detail below, the TSC may vary based on factors external to the power delivery system, including the voltage of the source connected to the input port of the power delivery system, ambient temperature, and/or temperature of components associated with the power delivery system.

Minimum Reserve Power—fixed value designating a minimum power reserve for each port. That is, while allocating power to one or more ports, power equal to the minimum reserve power is held back to ensure the minimum reserve power is available for distribution to the output port in the event a device is connected.

Maximum Power Per Port (PDP)—the PDP describes the maximum output power that may be provided to a particular output port. In general, the maximum PDP is based on the TSC as well as the minimum reserve power to ensure that power delivered to a particular port does not render the power delivery system unable to provide at least the minimum reserve power to the remaining output ports.

Contracted Power (CP)—describes the contracted power delivered by the power delivery system to a particular output port. The contracted power cannot exceed the maximum PDP.

Available Shared Capacity (ASC)—shared capacity available for allocation to a particular port. The ASC varies based on changes to the TSC and the CP assigned to other ports. For example, the ASC associated with a particular output port may be expressed as the TSC less the contracted power assigned to the other ports. In addition, the ASC cannot exceed the maximum PDP.

Power Delivery (PD)—Power delivery protocols are utilized to allow communication between the power delivery system and connected devices to negotiate the allocation of power According to some aspects, the power delivery system acts to intelligently allocate power to the one or more connected devices. In particular, according to some aspects the power delivery system maximizes an initial non-PD power provided to a connected device during a first stage and then utilizes PD protocols to increase the power offered to the connected device during a second stage. Typically, a minimum reserve power is offered to a connected device, and power delivery protocols are subsequently utilized to allocate unused power to the newly connected device. However, this may result in a newly connected device receiving only the minimum reserve power, which in some cases may not provide adequate device charging/performance. According to some aspects, steps are taken in response to the connection/detachment of a new device to ensure the initial power offered to the newly connected device is greater than a threshold value (e.g., greater than the minimum reserve power). According to another aspect, the power delivery system monitors one or more external parameters that may reduce the total shared capacity (TSC) that can be allocated to the one or more connected devices. For example, in automotive applications the power source (e.g., car battery) utilized to supply power to the power delivery system may vary in the power made available. The power delivery system acts to monitor these external parameters and adjust the TSC associated with the power delivery system based on the external parameters. Changes in the TSC result in changes to the available shared capacity (ASC), and therefore to the contract power (CP) that can be provided to the connected devices. In some cases, a decrease in the TSC results in a corresponding decrease or load shedding of CP offered to the one or more connected devices. According to another aspect, the power delivery system monitors the device charging parameters associated with connected devices. For example, a determination that a device has reached a fully charged state and/or requires less charging power indicates that CP associated with the connected device can be reduced and made available to one or more other connected devices.

FIG. 1 is a block diagram of a vehicular charging system according to some embodiments. The vehicle charging system includes a power delivery system 100, having an input port 102 and one or more output ports 104A, 104B. Input port 102 is configured to receive power from vehicle battery/power supply 106. Output ports 104A, 104B are connected to respective devices (e.g., loads, charging devices) 108A, 108B. Power delivery system 100 further includes a power delivery controller 110 that intelligently shares power between the output ports 104A, 104B. For the sake of simplicity, the embodiment shown in FIG. 1 shows only first and second output ports 104A and 104B. In other embodiments, additional output ports may be associated with the power delivery system 100. A single output port may be utilized, although a number of the power sharing requirements would not longer be applicable.

In some embodiments, the output power provided by the vehicle battery/power supply 106 may vary in response to one or more conditions. For example, in some embodiments the output power provided by the vehicle battery/power supply 106 varies with ambient temperature and/or battery voltage. Changes in the power provided by the vehicle battery/power supply 106 changes the total power—referred to as the total shared capacity (TSC)—that can be provided to output ports 104A, 104B. In some embodiments, the power delivery controller 110 responds to changes in the total shared capacity (TSC) by decreasing contracted power (CP) provided to one or both of the output ports 104A, 104B. In some embodiments, this is referred to as 'load shedding'.

In some embodiments, power delivery system 100 intelligently manages changes in power sharing between respective output ports 104A, 104B in response to loads being selectively connected to one or both output ports 104A, 104B. For example, USB-C charging protocols require a minimum reserve power be offered—at least initially—to a newly connected load or charging device 108A, 108B. Typically, the minimum reserve power offered according to power delivery protocols (e.g., USB-IF) is less than ideal for charging purposes (e.g., 7.5 W). In some embodiments, the power delivery controller 110 implements functions to maximize the initial power contract provided to a connected load. In some embodiments, this may include modifying power contracts associated with one or more of the other output ports in order to maximize the initial power contract provided to the output port. In some embodiments, the power delivery system 100 may also provide intelligent power sharing to output ports 104A, 104B based on changes in device charging parameters (e.g., state of charge of a device, reduced power consumption, etc.). For example, in some embodiments a decrease in power consumption by a device connected to the output port 104B may result in a reduction of contract power (CP_P2) offered to output port 104B and a corresponding increase in contract power (CP_P1) offered to output port 104A. As described in more detail below, power delivery controller 110 may provide additional intelligent load shedding and/or power sharing.

Figure 2:
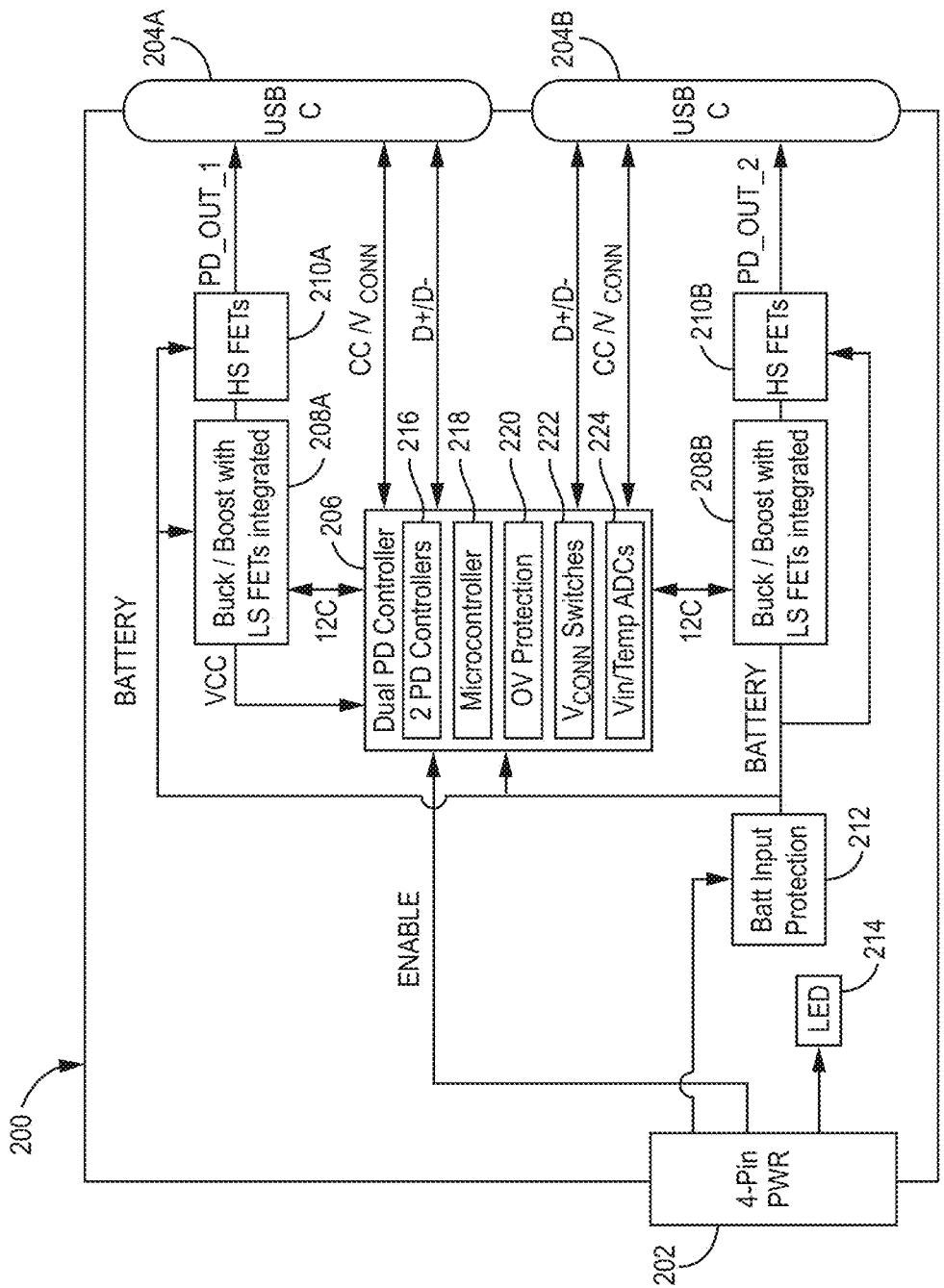
FIG. 2 is a block diagram of an intelligent power delivery system according to some embodiments.

FIG. 2 is a block diagram of an intelligent power delivery system 200 according to some embodiments, which includes a four-pin input port 202, first and second USB-C output ports 204A, 204B, a dual power delivery (PD) controller 206, first and second buck/boost converters 208A, 208B (e.g., low-side (LS), field effect transistors (FET) power converter), first and second switches 210A, 210B (e.g., high-side (HS) field-effect transistors (FET)), battery input protection circuit 212, and light-emitting diode 214. In some embodiments, dual PD controller 206 further includes first and second PD controllers 216, microcontroller 218, overvoltage (OV) protection circuit 220, $V_{CONN}$ switches 222, and $V_{in}$/Temp analog-to-digital converter (ADC) 224. In the embodiment shown in FIG. 2, first and second buck/boost converters 208A, 208B includes an internal low-side (LS) field-effect transistor (FET), with an externally located high-side (HS) field-effect transistor (FET) switch 210A, 210B. In some embodiments, the internal LS FET and external HS FET provide good thermal performance as compared with integrated converters. In other embodiments, the LS FETs and HS FETs may be implemented into a single internal buck/boost converter. Once again, in the embodiment shown in FIG. 2, only first and second USB-C output ports 204A, 204B are shown, but in other embodiments the intelligent power delivery system 200 may include additional output ports.

Source power from a battery or generator is provided to the intelligent power delivery system 200 at four-pin input port 202. For example, in an automotive application, source power may be 12V. Source power is distributed through battery input protection circuit 212 to first and second buck/boost converters 208A, 208B and dual PD controller 206. In some embodiments, dual PD controller 206 communicates with eligible loads or sinks connected to first and second USB-C output ports 204A, 204B via the CC/$V_{CONN}$ and D+/D– channels. For example, the dual PD controller 206 utilizes a power delivery protocol to offer and then contract power delivered to loads/sinks connected to the first and second USB-C output ports 204A, 204B. Having contracted with one or more loads to deliver contracted power (CP), dual PD controller 206 provides control instructions to first and second buck/boost converters 208A, 208B (as well as HS FETs 210A, 210B) to provide the desired output voltage and current to the respective USB-C output ports 204A, 204B.

In some embodiments, dual PD controller 206 may further include one or more PD controllers 216 (e.g., separate PD controller for each channel or output port), a microcontroller 218, OV protection circuit 220, $V_{CONN}$ switches 222, and Vin/Temp ADCs 224. In some embodiments, the PD controllers 216 are utilized to generate the control signals provided to the first and second buck/boost converters 208A, 208B to provide the contracted power (labeled here, PD_OUT_1, PD_OUT_2) to the respective USB-C output ports 204A, 204B. In some embodiments, microcontroller 218 executes stored instructions (e.g., stored to a computer readable medium) to implement one or more functions related to power delivery (e.g., flexible programming of a power delivery (PD) menu utilized to contract power with loads/sinks, load shedding, power sharing algorithms, etc.). In some embodiments, the Vin/Temp ADCs convert analog temperature and/or monitored voltages (e.g., source voltage provided to four-pin input port 202) to a digital signal that can be utilized by the microcontroller 218. For example, as described in more detail below, microcontroller 218 may utilize the monitored input voltage and/or temperature to adjust the available shared capacity (ASC) available for provision to the one or more USB-C output ports 204A, 204B.

Figure 3:
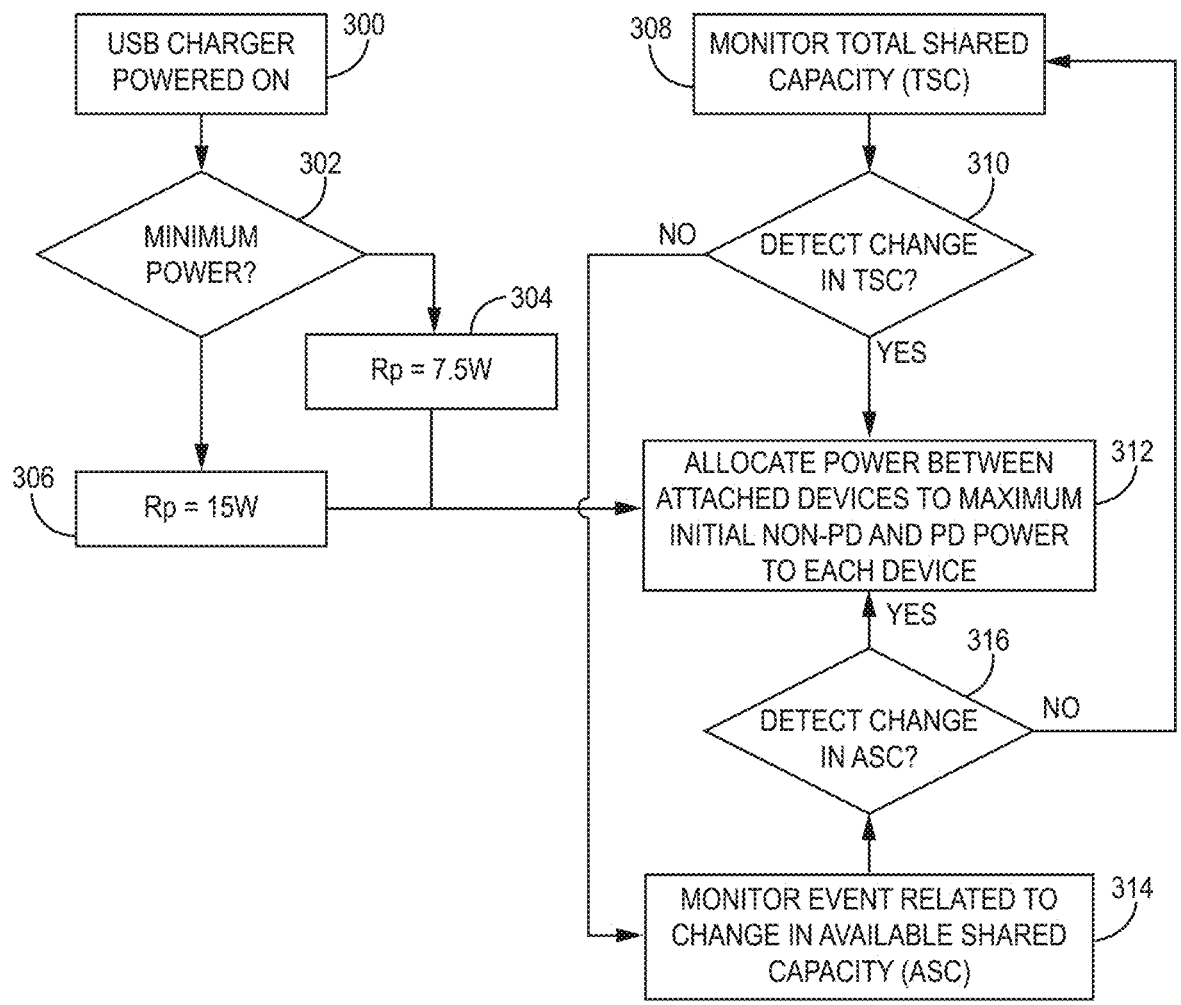
FIG. 3 is a flowchart illustrating steps performed by the power delivery system according to some embodiments.

FIG. 3 is a flowchart illustrating steps performed by the power delivery system according to some embodiments. In general, FIG. 3 illustrates the events that trigger the power delivery system to allocate or re-allocate power between attached devices (shown at step 312). In general, the allocation or re-allocation of power at step 312 acts to maximize the initial non-PD (power delivery) power offered to connected chargers/devices and to further maximize the PD power offered to connected chargers/devices.

In general, the allocation of power between attached devices occurs in response to one or more events occurring, including but not limited to the attachment/detachment of a charger/device from the power delivery system, a change in total shared capacity (TSC) of the power delivery system, and/or a change in the available shared capacity (ASC) of the power delivery system. As shown in FIG. 3, monitoring of the TSC and ASC may happen continuously in the background, wherein a detected change in either TSC or ASC results in an allocation of power between attached devices at step 312. In addition, a charger/device being attached/detached to the power delivery system results in an allocation of power between attached devices (or remaining attached devices). In either event, the process used to allocate power remains the same, as described in more detail with respect to FIG. 4.

As shown in FIG. 3, the attachment or powering On of a charger attached to one of the output ports at step 300 will initiate the process of allocating power between the attached devices. In In some embodiments, having detecting that a USB charger has been attached or powered on at step 300, then at step 312 the power delivery system allocates power between attached devices and in particular acts to maximum the initial non-PD power offered to the attached USB charger or device. In some embodiments, in response to a USB charger being connected or powered on at step 300, a determination is made at steps 302, 304 and 306 regarding the minimum power to be offered by the power delivery system. In some embodiments, the minimum power is encoded in the value of resistors (labeled Rp in some embodiments) associated with the output port. In some embodiments, the minimum power determined at steps 302, 304, and 306 determines how power is allocated at step 312. In other embodiments, the allocation of power at step 312 is performed independent of the value of the minimum power determined at step 302. Typically, the minimum power offered by the power delivery system is set to either 7.5 W or 15 W. In some embodiments, it is desirable to provide a minimum of 15 W to a connected charger or device, even if the minimum assigned by the Rp value is 7.5 W, as described with respect to FIG. 4 below.

In addition to the attachment and/or powering On of a charging device, changes in the TSC and/or ASC of the power delivery system result in an allocation of power between the attached devices at step 312. For example, in some embodiments at step 308 the power delivery system monitors the total shared capacity (TSC), which refers to the total power available to be distributed by the power delivery system. In automotive applications, the TSC may vary in response to one or more factors, including changes to the vehicle battery input voltage, vehicle battery input current, and/or ambient temperature. In some embodiments, the intelligent power delivery system monitors one or more external parameters, such as ambient temperature, battery voltage, and/or battery current and utilizes the monitored external parameters to detect changes in TSC. For example, a decrease in steady state battery voltage (shown in FIGS. 6A, 6B, for example) corresponds with a decrease in TSC (and vice versa, an increase in steady state battery voltage may indicate an increase in TSC). An increase in ambient temperature corresponds to a decrease in TSC (and vice versa, a decrease in ambient temperature corresponds to an increase in TSC). As the name implies, a decrease in TSC capacity means less power available to be shared among the connected chargers/devices. Likewise, an increase in TSC capacity (in response to an increase in steady state battery voltage/current, decrease in ambient temperature) means more power is available to connected chargers/devices. Therefore, at step 310 a determination is made whether a change (increase or decrease) in TSC has been detected. In some embodiments, this includes comparing the monitored TSC from step 308 to a previously monitored TSC. If a change in TSC is detected at step 310, then power is allocated between attached chargers/devices at step 312. If no change in TSC is detected at step 310, then at step 314 events are monitored related to changes in available shared capacity.

At step 314, events are monitored with respect to changes in ASC. In some embodiments, ASC is measured with respect to a particular output port, whereas TSC is measured with respect to the entire power delivery system. However, the ASC calculated for a particular port may change (increase or decrease) in response to events happening on other ports. For example, in some embodiments events that may result in a change to ASC (on a particular port) include a detected capability mis-match between the power delivery system and a connected charger/device, a state of charge associated with a connected charger/device, a change in power consumption associated with a connected charger/device, an over-current condition, a device power give back (e.g., connected charger/device provides power back to the power delivery system), a change in TSC, and/or unique actions based on the connected device and/or power delivery system. In response to a detected change in ASC at step 316 power is allocated between attached chargers/devices at step 312.

At step 312, power is allocated between attached devices. In some embodiments, the allocation of power between attached devices includes maximizing non-PD power provided to the devices. That is, in response to attachment/detachment of a device, change in TSC, and/or a change in ASC, the initial power offered to connected devices is maximized at step 312. In some embodiments, PD methods are subsequently utilized to allocate power intelligently between the plurality of connected devices. However, maximizing the initial power offered to a connected device may provide a number of benefits. For example, the USB-C protocol provides power on a first come, first serve basis and only requires that a minimum threshold of power (e.g., 7.5 W) be reserved for each unused port (i.e., minimal reserve power). As a result, it is possible that a connected device may only be able to draw a minimum amount of power from the power delivery system—one that may provide inadequate charging power. For non-PD devices (i.e., those not capable of negotiating allocation of power with the power delivery system intelligently) the initial power offered may be the final power offered, therefore it is beneficial to maximize the initial power offered at step 312. As described in more detail with respect to FIG. 4, maximizing the initial power offered to a connected device may include decreasing the contracted power provided to one or more other devices. Although maximizing the initial power offered may include modifying the power provided to other devices, this step does not require the connected devices to utilize PD (power delivery) protocols. That is, the intelligent power delivery system acts to maximize the initial power provided regardless of whether the connected device is capable of PD communication (e.g., USB-C protocols). In some embodiments, the initial minimum power contract offered to the attached device at step 312 is provided within an initial time period (e.g., three seconds) of an event (attachment/detachment, TSC change, ASC change) resulting in step 312 being implemented.

In some embodiments, following provision of the initial minimum power contract provided to the newly connected device, step 312 further includes intelligently allocating power between the respective output ports using a power delivery protocol. This may include further increasing the initial power offered to a device depending on the available shared capacity (ASC) and power requested by the connected load/sink. In some embodiments, the allocation of power between the respective ports is also provided within the initial time period (e.g., three seconds).

Figure 4:
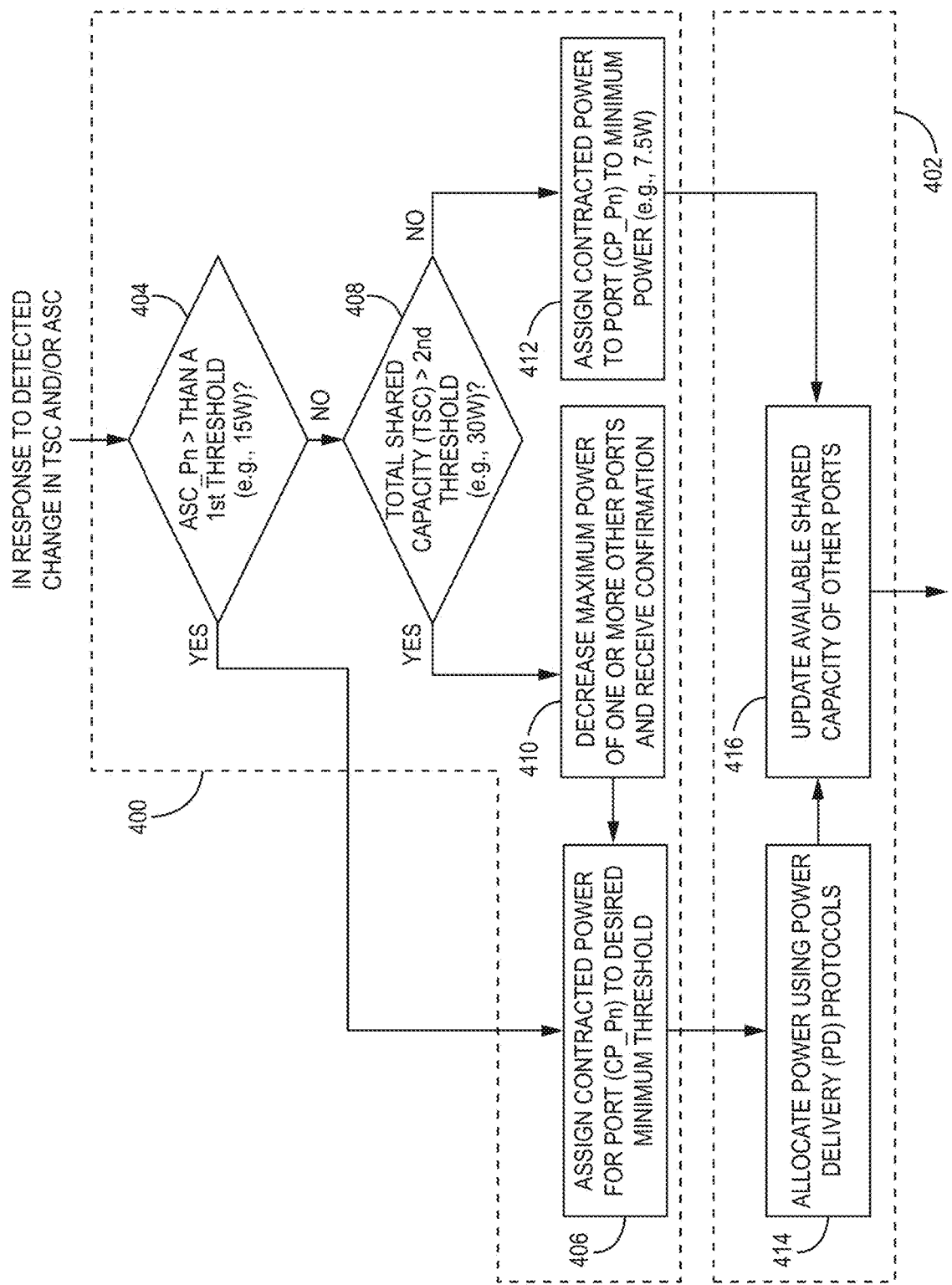
FIG. 4 is a flowchart illustrating steps performed by the power delivery system to maximize initial non-PD power and PD power supplied to connected devices according to some embodiments.

FIG. 4 is a flowchart illustrating in more detail steps utilized to allocate power between attached devices to maximize initial non-PD power and PD power (step 312 shown in FIG. 3) according to some embodiments. As described above, step 312 is implemented in response to an attachment/detachment of a device, a change in TSC and/or a change in ASC. During a first stage (illustrated by dashed box 400) the initial non-PD power is maximized. During a second stage (illustrated by dashed box 402), PD protocols are utilized to—to the extent possible—further increase the power provided to a given output port. In addition, the available shared capacity of other output ports is modified in the second stage in response to the power offered to the given output port.

The order in which output ports are analyzed may be determined based on the event that resulted in execution of step 312. For example, if a new device is connected to a first output port, then the steps shown in FIG. 4 are utilized to maximize the initial non-PD power offered to the newly attached device (and subsequently the PD power offered to the device). Likewise, a change in ASC associated with a given output port may result in the steps shown in FIG. 4 being utilized to maximize the initial non-PD power offered to the device following a change in ASC of that particular output port. In other embodiments, a change in TSC may result in application of the steps shown in FIG. 4 to each of the output ports having a connected device. The order in which output ports are analyzed may be predetermined (e.g., first output port, followed by the second output port, etc.) or may be based on some attribute of the output port (i.e., highest to lowest based on power consumption, etc.).

At step 404, the available shared capacity associated with a given output port (ASC_Pn) is compared to a threshold (e.g., first threshold). In some embodiments, the first threshold represents a minimum power that is considered satisfactory for provision to the connected device (e.g., 15 W). If the ASC_Pn is greater than the first threshold—indicating that the desired minimum power is available for provision to the given output port—then at step 406 the power delivery system contracts to deliver the desired minimum threshold power to the given output port (e.g., CP_Pn)—representing the power contracted for delivery to the given output port. In some embodiments, the desired minimum threshold power is equal to the first threshold (e.g., 15 W). In this way, the power delivery system is able to provide an initial power contract to the device connected to the given output port that is greater than a potentially lower minimum power (e.g., 7.5 W) reserved for the output port.

If at step 404 the available shared capacity associated with the given output port (ASC_Pn) is not greater than the first threshold, then this is indicative of a situation in which contracted power assigned to other ports has reduced the available shared capacity available to the given output port such that the desired minimum power is not available. In response, at step 408 a determination is made whether the total shared capacity (TSC) is greater than a second threshold. In some embodiments, the second threshold is greater than the first threshold, and in particular may be approximately twice that of the first threshold. For example, in some embodiments if the first threshold (desired initial power) is equal to 15 W, then the second threshold may be set equal to 30 W.

If at step 408 it is determined that the total shared capacity is not greater than the second threshold (e.g., less than 30 W), there is insufficient power available to offer the device connected to the given output port more than the minimum reserve power. As a result, at step 412 the power delivery system offers the device connected to the given output port the minimum reserve power for that port (e.g., 7.5 W) and at step 416 the available shared capacity for the other output ports are updated to reflect the contracted power offered to the given output port (CP_Pn). If at step 408 it is determined that the total shared capacity is greater than the second threshold (e.g., greater than 30 W), there is sufficient power available to offer the device connected to the given output port more than the minimum reserve power, despite the available shared capacity of the given output port (ASC_Pn) being less than the first threshold (e.g., 15 W). However, in order to provide the device connected to the given output port with contracted power greater than the minimum reserve power, the contract power offered to the one of the other output ports must be decreased. Because the total shared capacity is greater than the third threshold (e.g., 30 W), the contracted power offered to devices connected to one of the other output ports (e.g., CP_Pn+1) can be decreased but still maintained above the minimum reserve power. For example, if the total shared capacity is equal to 30 W, and the contracted power offered to a second output port (CP_P2) is equal to 22.5 W, then the available shared capacity (ASC_Pn) associated with the given output port (7.5 W) is less than the first threshold. However, by decreasing the contracted power offered to the second port (CP_P2)

from 22.5 W to 15 W, the available shared capacity (ASC_Pn) associated with the given port can be increased to 15 W as well. In this way, at step 410 the contracted power provided to one of the other output ports is decreased (in some embodiments, by an amount equal to the minimum reserve power, or by an amount equal to half the second threshold or desired initial contract offer). Upon receiving confirmation that the contracted power associated with one of the other output ports has been decreased at step 410, then at step 406 the contracted power for the device connected to the given output port (CP_Pn) is assigned to the first threshold (e.g., 15 W).

In this way, the steps illustrated within dashed box 400 act to maximize the initial non-PD power offered to a device connected to one of the output ports. In most situations, the steps illustrated in dashed box 400 ensures that the initial non-PD power offered to a connected device is satisfactory (e.g., 15 W).

Steps illustrated in dashed box 402 illustrate steps utilized to allocate power using PD protocols. At step 414, following maximizing of the initial non-PD power associated with a given output port, power may be allocated between the ports intelligently using power delivery protocols. In some embodiments, power allocation utilizing PD protocols requires the device connected to the output port to be PD compatible. If the device is not PD compatible, then the initial power offered in the first stage (box 400) is maintained. If the device is PD compatible, then the initial power offered in the first stage (box 400) may be increased using PD protocols. In response to the initial non-PD power offered to the given output port and subsequently to the PD power offered to the given output port (if different), the available shared capacity associated with other ports may have changed. At step 416 the ASC of other output ports are updated based on the power provided to the given output port.

Figure 5:
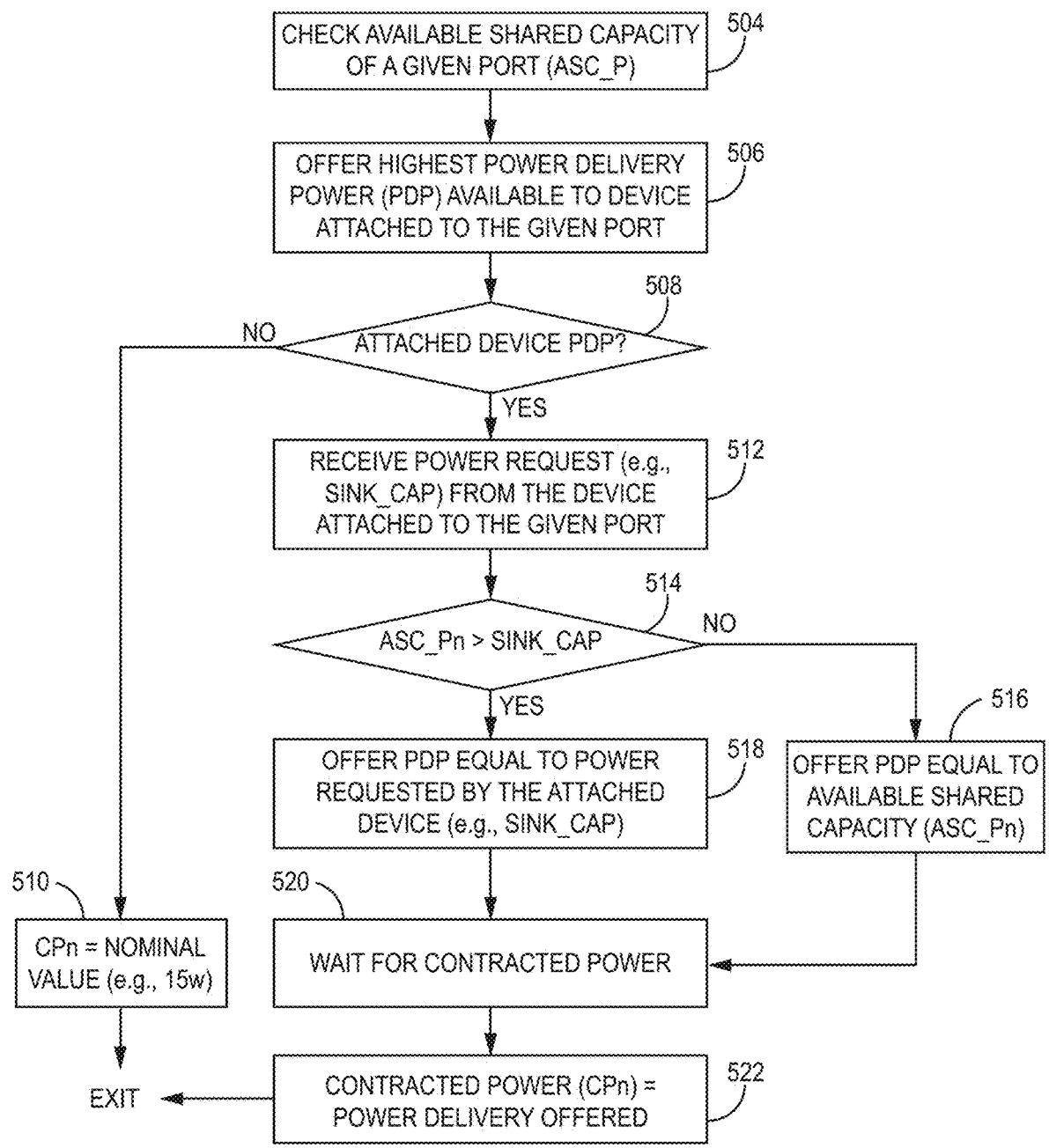
FIG. 5 is a flowchart illustrating steps performed by the power delivery system to provide PD power to connected devices according to some embodiments.

FIG. 5 is a flowchart illustrating steps performed by the vehicular charging system to provide intelligent power sharing according to some embodiments. In some embodiments, a power delivery (PD) protocol is utilized by the power delivery system to communicate with the one or more devices/chargers connected to the output ports and to selectively modify the power provided to the one or more devices/chargers. In some embodiments, PD protocols are utilized as part of the second stage (illustrated by box 402 in FIG. 4) to intelligently allocate power to a given output port. The steps illustrated in FIG. 5 describe one method of providing power delivery according to the present invention.

At step 504, available shared capacity (ASC_P) of a given port is determined. As described above, ASC_P of a given port is a function of the total shared capacity (TSC) and the contracted power (CP) currently being delivered to each of the other ports. Thus, a change in the TSC due to a change in the source voltage and/or temperature will result in a change in the ASC_P associated with a particular output port. Likewise, a device determined to be fully charged may result in a decrease in the contracted power delivered to that port. Although the total shared capacity has not changed in this instance, the ASC_P associated with the other ports will increase in response to a decrease in CP associated with other ports.

At step 506, source capabilities are sent to the attached device. In some embodiments, the menu or message sent to the attached device includes an offer to provide the highest power delivery power (PDP) available. The message may further request a response from the device providing one or more fields of information, including an error detecting response (e.g., CRCcheck), power delivery specification menu (e.g., PD2.0 or PD3.0), PDO selection, and/or operating current and max operating current of the device.

At step 508, based on the response received from the device, a determination is made whether the attached device is a power delivery device (e.g., PDP capable device). For example, if no response is received within a given time limit, a determination is made that the connected device is not PD-capable. If the attached device is not PD capable, then at step 510 the contracted power is assigned a nominal value (e.g., 15 W) that is less than or equal to the available shared capacity (ASC_P) of the given port. In some embodiments, the nominal value is equal to the first threshold described with respect to FIG. 4 (e.g., 15 W). If the device is a PDP device, then the power delivery system is capable of communicating and modifying contracted power.

At step 512, in response to the query from the power delivery system, the connected device provides a requested power (referred to sometimes as a SINK_CAP). Depending on the power delivery specification utilized by the connected device, the requested power may specify a particular voltage along a continuous range of voltages (e.g., 3.3V to 21V) or the requested power may specify a particular voltage from a plurality of discrete voltage values. In either case, the power delivery system receives a requested power from the connected device.

At step 514, the available shared capacity (ASC_P) determined at step 504 is compared to the requested power received from the connected device. If the ASC_P is greater than the requested power, then at step 516 the power delivery system offers the connected device the requested power. At step 520, the power delivery system waits for the contracted power, and then modifies the contracted power (CP) offered to the device. If the ASC_P is less than the requested power, then at step 518 the power delivery system offers the connected device the ASC_P—which is less than the requested power but the maximum available power. Once again, at step 520 the power delivery system waits for contracted power and then at step 522 modifies the CP offered to the device. The steps authorized in FIG. 5 may be performed continually during operation of the power delivery system, or may be implemented asynchronously in response to a change in the total shared capacity (TSC) and/or change in charging status of the connected devices. In this way, PD protocols allow for the power offered to a device during the second stage (box 402 as shown in FIG. 4) to be further increased beyond the initial power offered during the first stage.

Figure 6A:
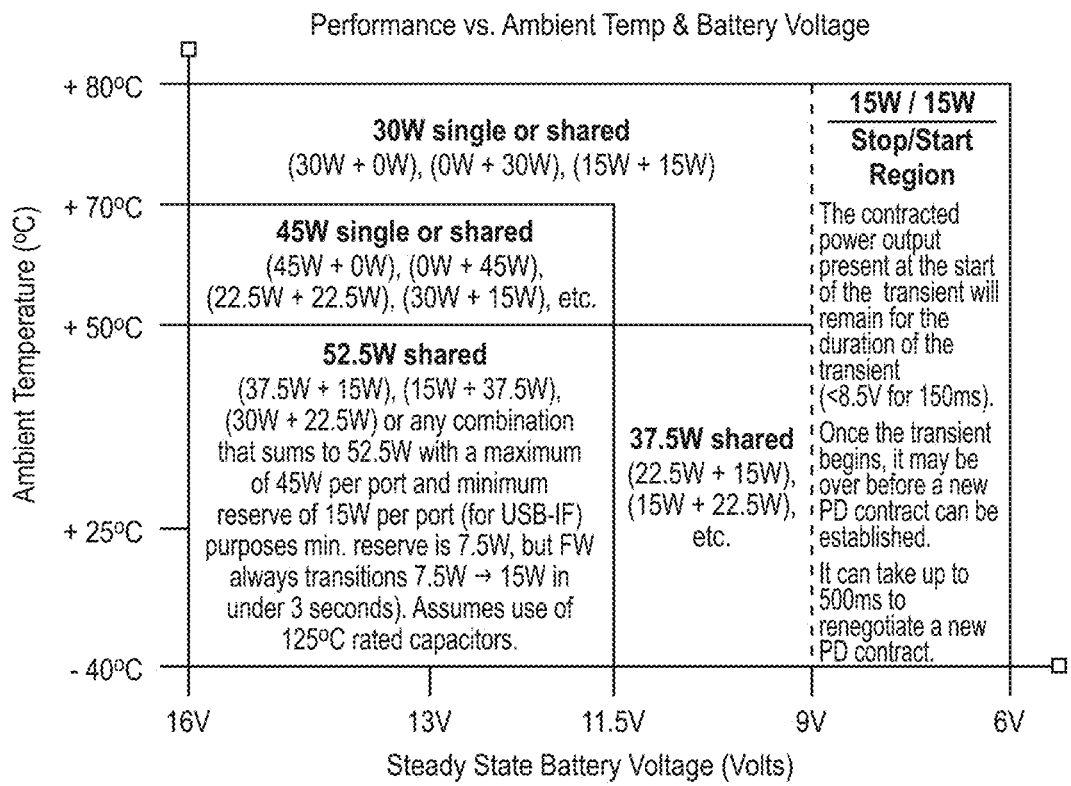
FIGS. 6A and 6B are charts illustrating total shared capacity (TSC) available in response to various input voltages and ambient temperature according to some embodiments.
Figure 6B:
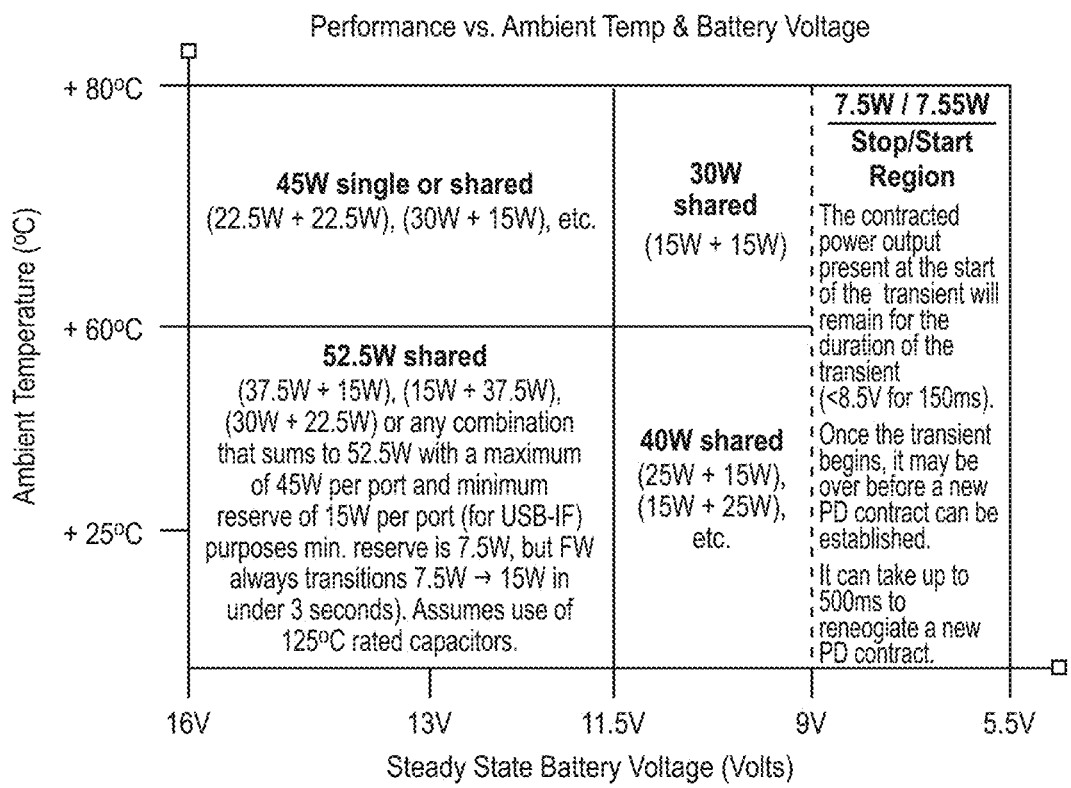

FIGS. 6A and 6B are charts illustrating the change in total shared capacity (TSC) of the power delivery system in response to changes in the steady state battery voltage provided at the input of the power delivery system and to changes in ambient temperature. The y-axis illustrates changes in temperature, ranging from −40° C. to +80° C. The x-axis illustrates the change in steady state battery voltage, ranging from 16V (near the y-axis) to 6V. In general, as the steady state battery voltage decreases, the total shared capacity (TSC) decreases. Likewise, as the temperature increases, the total shared capacity (TSC) decreases. For example, given a steady state input voltage of 16V to 11.5V and an ambient temperature of −40° C. to +50° C., the total shared capacity is equal to 52.5 W, which may be shared between available ports in a number of configurations. Depending on the maximum power per port and the minimum reserve power per port, a variety of combinations are possible. As the temperature increases to between +50° C. and +70° C., the total shared capacity decreases to 45 W.

An additional increase in temperature to between +70° C. and +80° C. results in the total shared capacity further decreasing to 30 W. Likewise, a decrease in steady state battery voltage (in the positive x-direction) corresponds with a decrease in total shared capacity.

The setpoints for modifying the total shared capacity (TSC) may be modified based on the application. For example, the embodiment shown in FIG. 6A illustrates an example in which voltage thresholds for changing the total shared capacity (TSC) are set at 11.5V and 9V. Likewise, temperature thresholds are set at +50° C. and +70° C. (depending on the steady state battery voltage). In the embodiment shown in FIG. 6B, different thresholds are utilized as well as different total shared capacity (TSC).

As discussed above, changes in the total shared capacity (TSC) cause changes to the available shared capacity (ASC_P) calculated for each of the plurality of ports. A decrease in total shared capacity (TSC) results in a corresponding decrease in available shared capacity (ASC_P) for each of the plurality of ports, and may therefore require re-negotiating contracted power (CP) with one or more of the plurality of ports to ensure that the sum of the contracted power (CP) is less than the total shared capacity (TSC).

Figure 7A:
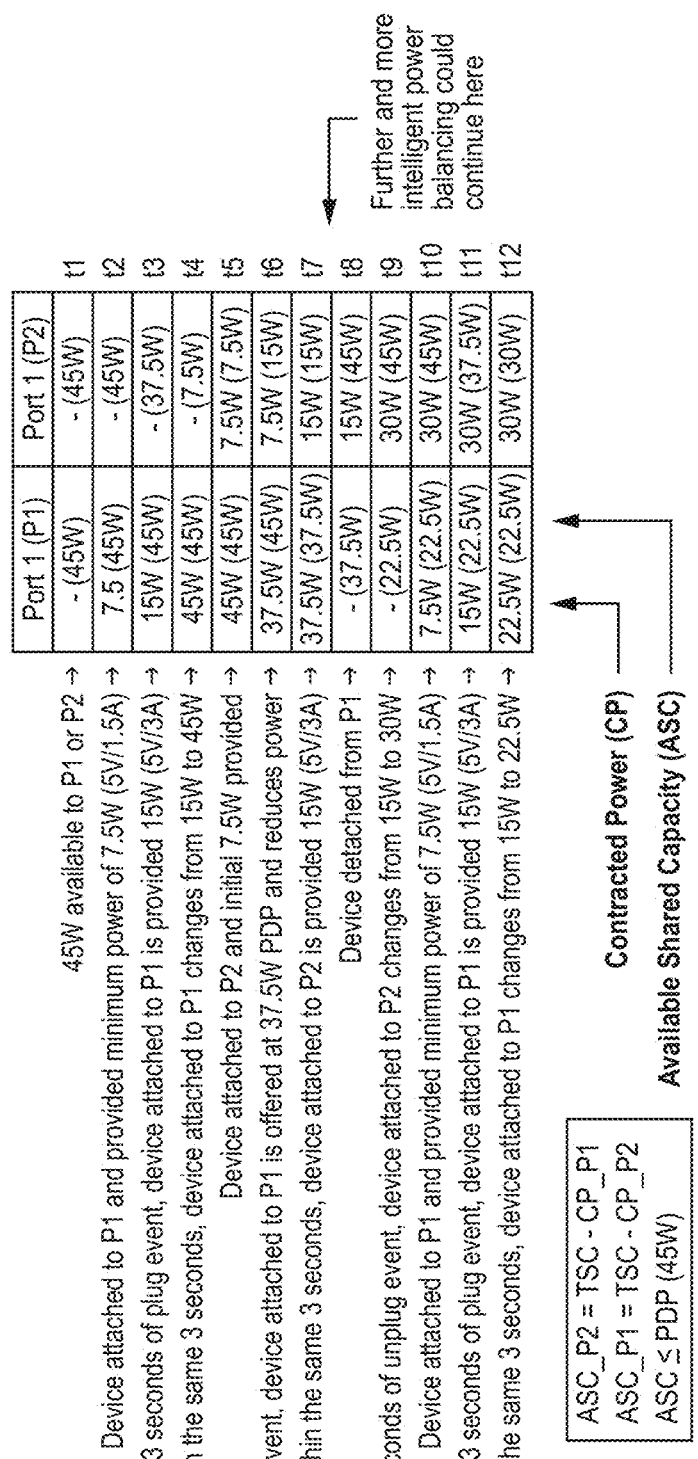
FIGS. 7A and 7B are diagrams illustrating intelligent power sharing between first and second ports according to some embodiments.
Figure 7B:
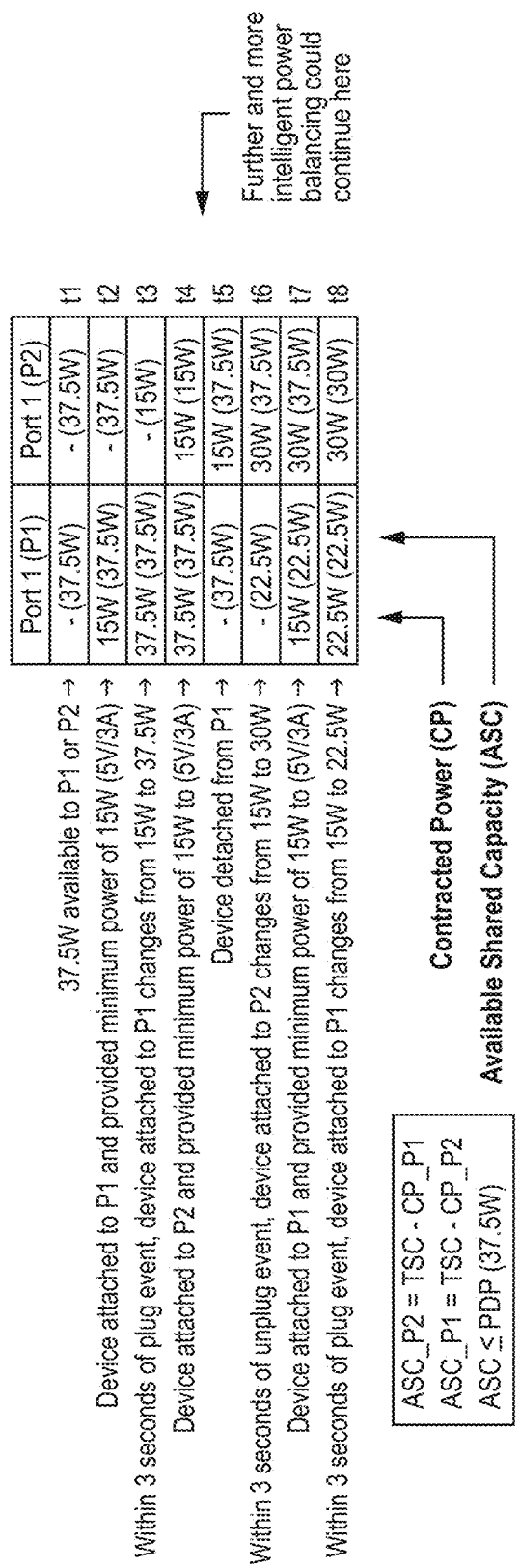

FIGS. 7A and 7B are diagrams illustrating intelligent power sharing between first and second ports according to some embodiments. In other embodiments, additional ports may be associated with the power delivery system. However, for the sake of simplicity a simple two-port power delivery system is described. The embodiment shown in FIG. 7A assumes intelligent power sharing based on a total shared capacity (TSC) of 52.5 W, a maximum power delivery power (PDP) of 45 W per port, and a required minimum reserve power of 7.5 W. With respect to each port—Port 1 (P1), and Port 2 (P2)—the contracted power (CP) is shown without parentheses and the available shared capacity (ASC) is shown in parentheses.

As described above, the available shared capacity at each port is defined as follows:

$$ASC\_P1 = TSC - CP\_P2 \qquad \text{Eq. 2}$$

$$ASC\_P2 = TSC - CP\_P1 \qquad \text{Eq. 3}$$

In addition, it is assumed for this exercise that the available shared capacity at any port is equal to or less than the max power delivery power (PDP) available at a given port. For example, if the maximum power delivery power at a given port is 45 W, then the available shared capacity must be less than or equal to 45 W, even if the total shared capacity is greater.

In the embodiment shown in FIG. 7A, at time t1 neither is receiving power and therefore neither port is assigned a contracted power (CP) value. As a result, the available shared capacity at each port is equal to 45 W. As described above, even though the total shared capacity in the example is 52.5 W, the available shared capacity (ASC) at any port must be less than or equal to the maximum power delivery power (PDP) at the given port.

At time t2, a device is attached to the first port (P1) and is assigned a minimum reserve power of 7.5 W. As discussed above, in some embodiments a port may be assigned a minimum reserve power (see step 404), wherein the first step is determining a contracted power to offer the newly connected device includes assigning a minimum reserve power for the port. In this instance, the available shared capacity ASC_P1 and ASC_P2 remains unchanged despite the contracted power of 7.5 W assigned to port P1.

At time t3, the contracted power offered to the first port (P1) is increased from 7.5 W to 15 W. As described with respect to FIG. 4, in the instant case the available shared capacity ASC_P1 for the first port is 45 W even though Equation 3 would indicate an available shared capacity ASC_P1 of 52.5 W, because ASC_P1<PDP (e.g., 45 W). As described in FIG. 4 at step 404, because the available shared capacity ASC_P1 (45 W) is greater than the first threshold (e.g., 15 W), the first port is assigned contracted power equal to the first threshold (e.g., 15 W). In some embodiments, this step is performed within the initial time period (e.g., three seconds) of the device being connected. The available shared capacity (ASC_P1) of the first port remains 45 W while the available shared capacity (ASC_P2) of the second port is decreased to 37.5 W.

At time t4, power delivery protocol is utilized to offer the device connected to port 1 additional power. In some embodiments, this step is also performed within the initial time period (e.g., three seconds) of the device being connected. For example, this action would correspond with step 416 described with respect to FIG. 4. In this embodiment, the device connected to port 1 requests 45 W of power. Given that the available shared capacity (ASC_P1) associated with the first port is equal to 45 W, the power delivery system agrees to a contracted power (CP_P1) of 45 W. Because no device is connected to the second port, the available shared capacity (ASC_P1) of the first port remains 45 W. However, because the contracted power (CP_P1) offered to the first port is equal to 45 W, the available shared capacity (ASC_P2) of the second port is decreased to 7.5 W (e.g., 52.5 W (TSC)−45 W (CP_P1)).

At time t5, a second device is attached to the second port (P2). In response, the minimum reserve power is assigned to the second port. At this point, the available shared capacity (ASC_P2) associated with the second port is equal to 7.5 W and the contracted power is likewise equal to 7.5 W. The contracted power (CP_P1) and available shared capacity (ASC_P1) associated with the first port remain unchanged.

At time t6, the steps shown in FIG. 4 are utilized to maximize the initial power offered to the second port. In this example, because the available shared capacity (ASC_P2) associated with the second port is less than the first threshold (e.g., 15 W) (determined at step 404), and because the total shared capacity (52.5 W) is greater than a second threshold (e.g., 30 W), at step 416 the contracted power (CP_P1) associated with the first port is decreased—in this example from 45 W to 37.5 W. As a result of this reduction in contracted power provided to the first port, the available shared capacity (ASC_P2) associated with the second port is increased to 15 W. For the time being, the contracted power (CP_P2) associated with the second port remains at 7.5 W.

At time t7, the increased available shared capacity (ASC_P2) associated with the second port is offered to the second port. The contracted power (CP_P2) associated with the second port is increased from 7.5 W to 15 W (corresponding with step 522 shown in FIG. 5), and as a result the available shared capacity (ASC_P1) associated with the first port is decreased from 45 W to 37.5 W (associated with step 416 shown in FIG. 4).

In the embodiment shown in FIG. 7A, at time t8 the first device is disconnected from the first port. However, assuming that the first device is not disconnected from the first port (P1), then at subsequent time intervals power delivery protocols could be utilized to intelligently balance the distribution of power to the ports. For example, in response to the first connected device reaching a fully charged state, the power delivery system may utilize power delivery protocols to reduce the contracted power (CP_P1) provided to the connected device and makes the saved power available to the second device. In other embodiments, a reduction in total shared capacity due to an external event (decrease in source voltage, increase temperature, tec.) may similarly result in intelligent balancing of power shared among the various ports.

At time t8, the device connected to the first port (P1) is disconnected. As a result, the contracted power (CP_P1) associated with the first port decreases to zero and the available shared capacity (ASC_P2) associated with the second port increases to 45 W as a result.

At time t9, the power delivery system negotiates with the device connected to the second port to increase the contracted power. In some embodiments, this is performed within a first time period following the disconnect of the first device. In this example, the available shared capacity (ASC_P2) associated with the second port is equal to 45 W. The power delivery system contracts with the second device to increase the contracted power (CP_P2) provided to the connected device. In this example, the contracted power (CP_P2) is equal to 30 W. As a result, the available shared capacity (ASC_P1) associated with the first port is decreased to 22.5 W.

At time t10, a device is connected again to the first port and is offered the minimum reserve power of 7.5 W. This corresponds to step 404 shown in FIG. 4. The available shared capacity (ASC_P1, ASC_P2) associated with the first port and the second port, respectively, remains unchanged.

At time t11, the contracted power offered to the first port (P1) is increased from 7.5 W to 15 W. As described with respect to FIG. 4, at step 404 the available shared capacity (ASC_P1) associated with the first port is determined to be greater than the second threshold, resulting in the contracted power (CP_P1) provided to the first device being increased from 7.5 W to 15 W (step 522 in FIG. 5). In response, the available shared capacity (ASC_P2) associated with the second port is decreased from 45 W to 37.5 W, but the contracted power (CP_P2) remains unchanged at 30 W. As discussed above, in some embodiments the increase in power provided to the first port is performed within the first time period (e.g. three seconds) following connection of the device to the first port.

At time t12, power delivery protocol is utilized to offer the device connected to port 1 additional power. In some embodiments, this step is also performed within the initial time period (e.g., three seconds) of the device being connected. For example, this action would correspond with step 414 described with respect to FIG. 4. In this embodiment, the device connected to port 1 requests maximum power (e.g., 45 W). Given that the available shared capacity (ASC_P1) associated with the first port is equal to only 22.5 W, the power delivery system agrees to provide contracted power (CP_P1) at the available 22.5 W (rather than the requested 45 W). In addition, the available shared capacity (ASC_P2) of the second port is decreased from 37.5 W to 30 W.

With respect to FIG. 7B, another scenario is provide in which the total shared capacity is equal to 52.5 W, the maximum power delivery power (PDP) is set to 37.5 W and a minimum reserve power is set to 15 W.

At time t1, no devices are connected to either of the ports. As a result, neither port has a contracted power (CP) value, and the available shared capacity (ASC_P1, ASC_P2) for both ports is 37.5 W. In contrast with the example provided in FIG. 7A, the available shared capacity reflects the greater magnitude minimum reserve power of 15 W (ASC_P1≤PDP (37.5 W), hence the ASC_P1 of 37.5 W.

At time t2, a device is attached to the first port (P1) and is provided with the minimum reserve power (15 W). The available shared capacity (ASC_P2) remains unchanged.

At time t2, a device is connected to port P1. In this example, the minimum reserve power of 15 W is offered to the device and becomes the contracted power (CP_P1). With respect to FIG. 4, the minimum reserve power is offered at step 404. The contracted power (CP_P1) is set to 15 W, and the available shared capacity (ASC_P2) remains at 37.5 W (ASC_P2 (37.5 W)=TSC (52.5 W)-CP_P1 (15 W)).

At time t3, within the initial time period following connection of the first device the contracted power (CP_P1) is increased from 15 W to 37.5 W. In this example, because the minimum reserve power is greater than a first threshold, there is no need to perform the analysis described at FIG. 4 with respect to steps 408-412. Rather, the contracted power (CP_P1) is assigned the first threshold (e.g., 15 W) as shown at step 522 of FIG. 5. The available shared capacity (ASC_P2) associated with the second port is changed to 15 W (ASC_P2 (15 W)=TSC (52.5 W)-CP_P1 (37.5 W)).

At time t4, a device is connected to the second port (P2) and is offered the minimum reserve power (15 W). The contracted power (CP_P1) and available shared capacity (ASC_P1) associated with the first port remains unchanged because the minimum reserve power (15 W) is greater than the first threshold (at step 406). Thus, the contracted power (CP_P1) remains at 15 W.

At time t5, the device attached to the first port (P1) is detached. As a result, the contracted power (CP_P1) is set to zero and the available shared capacity (ASC_P2) associated with the second port is increased to 37.5 W. If the device is not disconnected, then in the time subsequent to time t5 additional intelligent power sharing may be provided. For example, in some embodiments, in response to the device connected to the first port reaching a fully charged state, power may be allocated from the first port to the second port.

At time t6, the power delivery system utilizes power delivery protocols to offer additional power to the device connected to the second port (P2). In some embodiments, this is provided within the first time period following detachment of the device from the first port (P1). In some embodiments, this would be performed at step 414 in the embodiment shown in FIG. 4. In the example shown in FIG. 4, the device connected to the second port (P2) requests 30 W. Because the requested power (30 W) is less than the available shared capacity (ASC_P2, 37.5 W) associated with the second port, the power delivery system contracts to delivery 30 W to the device connected to the second port. The available shared capacity (ASC_P1) associated with the first port is decreased to 22.5 W.

At time t7, a device is connected to the first port (P1) and is provided with the minimum reserve power (15 W). As discussed above, because the minimum reserve power is greater than or equal to the first threshold (15 W), the contracted power (15 W) provided at step 404 is deemed sufficient as an initial power offering and no analysis is provided under steps 408-412.

At time t8, the power delivery system utilizes power delivery protocols to offer additional power to the device connected to the first port (P1). In this example, the device connected to the first port may request 37.5 W (as requested at time t3). However, because the available shared capacity (ASC_P1) associated with the first port is 22.5 W, the request of 37.5 W is denied and contracted power for 22.5

W is provided instead. In addition, the available shared capacity (ASC_P2) associated with the second port is decreased to 30 W.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

DISCUSSION OF POSSIBLE EMBODIMENTS

The following are non-exclusive descriptions of possible embodiments of the present invention.

According to one aspect, a method of intelligently allocating power to one or more devices connected to a power delivery system includes detecting an event related to an allocation of power between the one or more connected devices. The method further includes maximizing an initial non-power delivery (non-PD) power provided to at least one of the connected devices based on an available shared capacity (ASC) associated with at least one connected device and also includes allocating power to the at least one connected device using PD protocols.

The method of the preceding paragraph can optionally include, additionally and/or alternatively any, one or more of the following features, configurations and/or additional components.

For example, the step of detecting an event related to an allocation of power between the one or more connected devices may include detecting a device being attached/detached from the power delivery system.

In some embodiments, the step of detecting an event related to an allocation of power between one or more connected devices may include detecting a change in total shared capacity (TSC) of the power delivery system.

In some embodiments, the step of detecting a change in total shared capacity (TSC) of the power delivery system may include monitoring one or more of ambient temperature, steady state voltage provided to the power delivery system, and steady state current provided to the power delivery system.

In some embodiments, the step of detecting an event related to an allocation of power between one or more connected devices may include detecting a change in available shared capacity (ASC) associated with one or more connected devices.

In some embodiments, the step of detecting a change in ASC associated with one or more connected devices may include detecting a capability mis-match between the power delivery system and the one or more connected devices, a state of charge associated with the one or more of the connected devices, a change in power consumption associated with the one or more of the connected devices, an over-current condition, a power give back associated with the one or more of the connected devices, and a change in total shared capacity (TSC).

In some embodiments, maximizing an initial non-power delivery (non-PD) power provided to at least one of the connected devices based on an available shared capacity (ASC) associated with the at least one connected device may include comparing an available shared capacity (ASC) associated with the at least one connected device to a first threshold, wherein if the ASC is greater than or equal to the first threshold then the power delivery system provides a desired minimum power to the at least one connected device, wherein the desired minimum power is greater than a minimum reserve power.

In some embodiments, the desired minimum power may be equal to or greater than 15 W and wherein the minimum reserve power may be less than 15 W.

In some embodiments, if the ASC is less than the first threshold then a total shared capacity (TSC) of the power delivery system may be compared to a second threshold, wherein if the TSC is greater than or equal to the second threshold then contracted power is decreased with respect to one or more other connected devices and the power delivery system provides the desired minimum threshold power to the at least one connected device.

In some embodiments, the second threshold may be greater than the first threshold.

In some embodiments, if the TSC is less than the second threshold then the power delivery system may provide a minimum reserve power to the at least one connected device, wherein the minimum reserve power is less than the desired minimum threshold power.

In some embodiments, allocating power to the at least one connected device using PD protocols may be performed subsequent to the step of maximizing an initial non-power delivery (non-PD) power provided to at least one of the connected devices, wherein allocating power to the at least one connected device using PD protocols allows contracted power to be provided to the at least one connected device greater than the desired minimum threshold power.

According to another aspect, a power delivery system includes an input port configured to receive power from a power supply and at least a first output port, wherein the first output port is configured to supply power to a connected device. The power delivery system further includes a power delivery controller, wherein the power delivery controller maximizes an initial non-power delivery (non-PD) power provided to a device connected to the first output port during a first stage and utilizes power delivery (PD) protocols to increase power provided to the device connected to the first output port during the second stage.

The power delivery system of the preceding paragraph can optionally include, additionally and/or alternatively any, one or more of the following features, configurations, and/or additional components.

In some embodiments, the power delivery controller may initiate the first stage in response to at least one of detected attachment/detachment of devices from the first and second output ports, detected changes in total shared capacity (TSC) of power available to distribute to the first output port, and detected changes in available shared capacity (ASC) associated with the first output port.

In some embodiments, the power delivery controller may calculate the TSC based on one or more of monitored ambient temperature, steady state voltage provided to the input port, and steady state current provided to the input port.

In some embodiments, during the first stage the power delivery controller may compare an available shared capacity (ASC) associated with a first output port to a first threshold, wherein if the ASC associated with the first output port is greater than or equal to the first threshold then the power delivery controller offers a desired minimum power to the device connected to the first output port.

In some embodiments, if the ASC associated with the first output port is less than the first threshold, then the power delivery controller may compare a total shared capacity (TSC) of the power delivery system to a second threshold, wherein if the TSC is greater than or equal to the second threshold then the power delivery controller decreases power provided to a device connected to a second output port and offers the desired minimum power to the device connected to the first output port.

In some embodiments, if the TSC is less than the second threshold then the power delivery controller may offer the device connected to the first output port a minimum reserve power, wherein the minimum reserve power is less than the desired minimum power.

In some embodiments, power delivery (PD) protocols utilized during the second stage allow the power delivery controller to increase the contracted power provided to the device connected to the first output port, wherein the increased power may be greater than a desired minimum threshold power provided during the first stage.

In some embodiments, the power delivery system may be a vehicular power delivery system connected to receive input power from a vehicle battery.

The invention claimed is:

1. A method of allocating power to one or more output ports connected to a power delivery system, the method comprising:
monitoring a total shared capacity (TSC) of the power delivery system;
detecting an event related to an allocation of power between the one or more output ports, including:
detecting a change in the total shared capacity (TSC) of the power delivery system;
maximizing an initial delivery of power to the one or more output ports without using power delivery protocols during a first stage, the power delivery protocols including a power request communication between the one or more output ports and the power delivery system; and
allocating power to the one or more output ports using the power delivery protocols during a second stage.

2. The method of claim 1, wherein the event related to the allocation of power between the one or more output ports is a detected decrease in the total shared capacity (TSC).

3. The method of claim 2, wherein maximizing the initial delivery of power to the one or more output ports without using power delivery protocols during the first stage includes comparing the total shared capacity (TSC) associated with at least one output port to a second threshold.

4. The method of claim 3, wherein maximizing the initial delivery of power to the one or more output ports without using power delivery protocols during the first stage includes decreasing a maximum power output to one or more other output ports in response to the total shared capacity (TSC) being greater than the second threshold.

5. The method of claim 4, wherein maximizing the initial delivery of power to the one or more output ports without using power delivery protocols during the first stage includes assigning a minimum power output to one or more other output ports.

6. The method of claim 3, wherein maximizing the initial delivery of power to the one or more output ports without using power delivery protocols during the first stage includes assigning a minimum contracted power to one or more other output ports in response to the total shared capacity (TSC) being less than the second threshold.

7. The method of claim 1, wherein monitoring the total shared capacity (TSC) of the power delivery system includes monitoring one or more of ambient temperature, steady state voltage provided to the power delivery system, and steady state current provided to the power delivery system, and wherein detecting the change in the total shared capacity (TSC) of the power delivery system includes comparing a monitored total shared capacity (TSC) to a previously monitored total shared capacity (TSC).

8. The method of claim 1, wherein detecting the event related to the allocation of power between the one or more output ports includes detecting a change in an available shared capacity (ASC) of the one or more output ports, wherein maximizing the initial delivery of power to the one or more output ports without using power delivery protocols during the first stage includes comparing the available shared capacity (ASC) associated with the one or more output ports to a first threshold.

9. The method of claim 8, wherein the total shared capacity (TSC) is measured with respect to an entirety of the power delivery system and wherein the available shared capacity (ASC) is measured with respect to a particular output port within the power delivery system.

10. The method of claim 9, wherein if the available shared capacity (ASC) associated with at least one output port is greater than or equal to the first threshold then the power delivery system provides a desired minimum power to the at least one output port, wherein the desired minimum power is greater than a minimum reserved power.

11. The method of claim 10, wherein maximizing the initial delivery of power to the one or more output ports without using power delivery protocols during the first stage includes:
comparing the total shared capacity (TSC) associated with the at least one output port to a second threshold;
decreasing a maximum power output to one or more other output ports in response to the total shared capacity (TSC) being greater than the second threshold; and
assigning a minimum power output to the one or more other output ports.

12. The method of claim 1, wherein detecting the event related to the allocation of power between the one or more connected devices includes:
detecting a device being attached/detached from the power delivery system.

13. A power delivery system, comprising:
an input port configured to receive power from a power supply;
a first output port configured to supply power to a connected device; and
a power delivery controller, wherein the power delivery controller maximizes an initial delivery of power to the connected device without using power delivery protocols, the power delivery protocols including a power request communication between the connected device and the power delivery controller, wherein the initial delivery of power is provided to the connected device connected to the first output port during a first stage, and wherein the power delivery controller utilizes the power delivery protocols to increase power provided to the connected device connected to the first output port during a second stage,
wherein maximizing the initial delivery of power includes comparing a total shared capacity (TSC) of the power delivery system to a second threshold.

14. The power delivery system of claim 13, wherein the power delivery controller initiates the first stage in response to one or more of the following conditions:
- a detected attachment/detachment of a device from the first output port,
- a detected change in the total shared capacity (TSC) of power available to distribute to the first output port, and/or
- a detected change in an available shared capacity (ASC) associated with the first output port.

15. The power delivery system of claim 14, wherein the power delivery controller calculates the total shared capacity (TSC) based on one or more of monitored ambient temperature, steady state voltage provided to the input port, and steady state current provided to the input port.

16. The power delivery system of claim 15, wherein during the first stage the power delivery controller compares the available shared capacity (ASC) associated with a first output port to a first threshold, wherein if the ASC associated with the first output port is greater than or equal to the first threshold then the power delivery controller offers a desired minimum power to the device connected to the first output port.

17. The power delivery system of claim 13, wherein if the total shared capacity (TSC) is greater than or equal to the second threshold then the power delivery controller decreases power provided to a device connected to a second output port and offers the desired minimum power to the device connected to the first output port, and wherein if the total shared capacity (TSC) is less than the second threshold then the power delivery controller offers the device connected to the first output port a minimum reserve power, wherein the minimum reserve power is less than the desired minimum power.

18. A method of allocating power to one or more devices connected to a power delivery system, the method comprising:
- monitoring an available shared capacity (ASC) of the power delivery system;
- monitoring a total shared capacity (TSC) of the power delivery system;
- detecting a change in the available shared capacity (ASC) with one or more connected devices;
- comparing the available shared capacity (ASC) associated with an output port to a first threshold;
- comparing the total shared capacity (TSC) associated with at least one connected device to a second threshold in response to the available shared capacity (ASC) being less than the first threshold; and
- decreasing a maximum power of one or more other output ports in response to the total shared capacity (TSC) being greater than the second threshold.

19. The method of claim 18 further comprising:
- assigning a minimum contracted power to one or more other output ports in response to the total shared capacity (TSC) being less than the second threshold.

20. The method of claim 19, wherein detecting the change in the available shared capacity (ASC) associated with the one or more connected devices includes one or more of a detected capability mis-match between the power delivery system and the one or more connected devices, a state of charge associated with the one or more of the connected devices, a change in power consumption associated with the one or more of the connected devices, an over-current condition, a power give back associated with the one or more of the connected devices, and/or the change in the total shared capacity (TSC).

* * * * *